G. W. SANBORN.
Sled Brake.
No. 100,560.  Patented March 8, 1870.
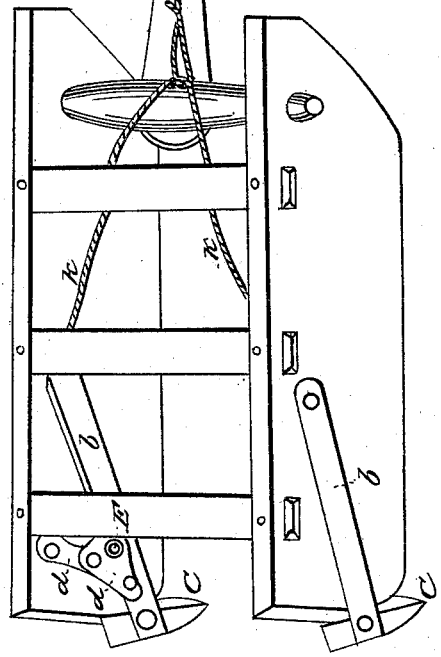
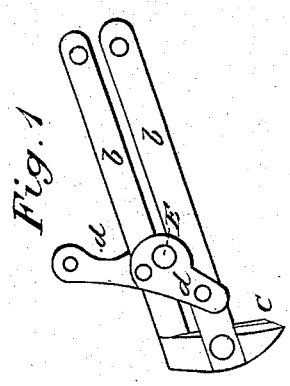

United States Patent Office.

GEORGE W. SANBORN, OF GILMANTON, NEW HAMPSHIRE, ASSIGNOR TO JEREMIAH W. SANBORN, OF SAME PLACE.

Letters Patent No. 100,560, dated March 8, 1870.

IMPROVEMENT IN SLED-BRAKES.

The Schedule referred to in these Letters Patent and making part of the same

---

I, GEORGE W. SANBORN, of Gilmanton, in the county of Belknap, and State of New Hampshire, have invented a new and improved Sled-Brake, of which the following is a specification.

Nature and Object of the Invention.

My invention consists in applying a sled-brake, and connecting the same with the yoke in such a manner that said brake becomes self-acting when it becomes necessary to hold back or brake up the sled.

Description of the Accompanying Drawings.

Figure 1 is a view of the levers with the dog.
Figure 2 is a view of the sled with dog and brake attached.

General Description.

I first construct an iron dog, marked $c$ in fig. 1, with the iron arms $b\ b$, and then attach to the arm $b$ a hinge-lever marked $a\ a$. I then attach the dog $c$, with the lever or brake, to the rear end of the sled-runner, by passing a rivet or bolt through the ends of the arms $b\ b$, and by passing a rivet or bolt through the end of the lever or brake $d\ d$.

I then attach a rope marked $k\ k$ to the levers $d\ d$ in the opening marked E E, and pass the rope under the second bar of the sled, the rope being held up by a staple driven into said bar on the under side of said second bar, and then pass said rope through the first bar of the sled, through two holes bored in said first bar. I then fasten to the ends of the ropes $k\ k$ a rope marked K, and pass it along the sled-tongue under the ring of the yoke, in a groove which is cut in the sled-tongue to prevent the ring from binding the rope. I then pass the rope around a truck or roller, G, in fig. 2, which is placed in the end of the sled-tongue, and fasten the rope to the yoke Y by the hook $h$, as seen in fig. 2.

When it is necessary to use the brakes, the attachment is made as set forth, and the cattle, by holding back on the yoke, draw on the levers or brakes $d\ d$ by means of the rope K $k\ k$, and the dog is forced into the ice or snow.

When the cattle start forward the rope is slackened, and the dogs are thrown out of the snow or ice by the weight of the sled.

When the brakes are not wanted, or it becomes necessary to back the sled, the rope K is unfastened from the yoke and tied into the ring of the yoke and the brakes are released.

The same method of hinge-levers may be applied to brakes for wagons or carts.

Claim.

I claim, as my invention—

The combination of the dog C and arms $b\ b$, the hinge-lever or brakes $d\ d$, attached by the ropes K $k$ $k$ to the yoke, substantially as and for the purpose hereinbefore set forth,

GEORGE W. SANBORN.

Witnesses:
    FRANK E. SANBORN,
    SIDNEY P. BUNKER.